June 11, 1963 R. P. WELLS ETAL 3,093,108
TIRE PRESSURE SIGNAL DEVICE
Filed Nov. 14, 1961
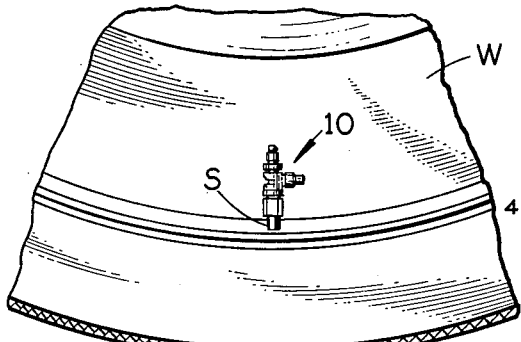
FIG. 1
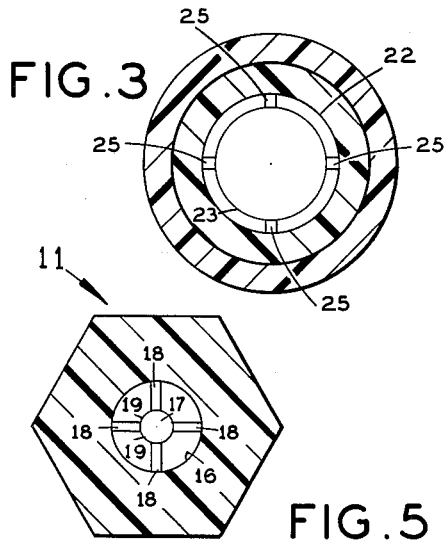
FIG. 3
FIG. 4
FIG. 5
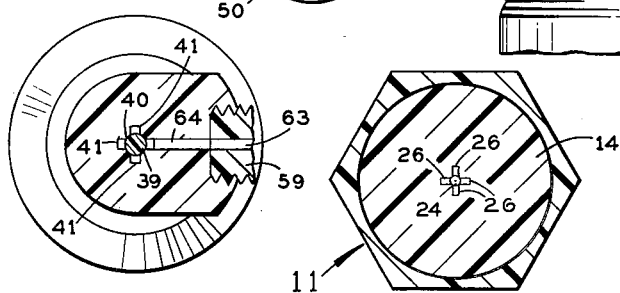
FIG. 6 FIG. 7
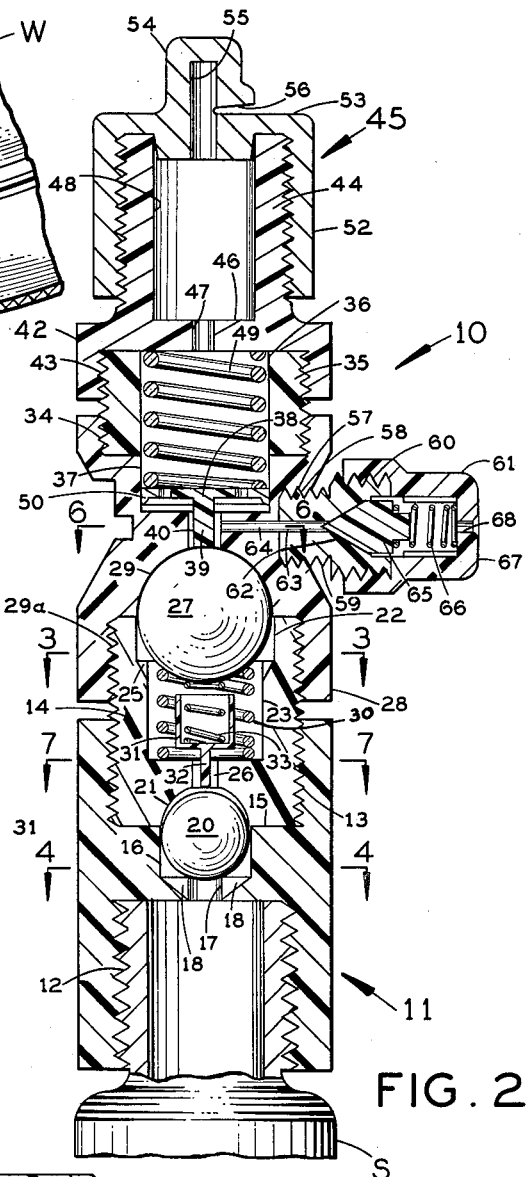
FIG. 2
INVENTORS
RALPH P. WELLS
JOYCE M. LAWRENCE
BY
Ernest H. Schmidt
ATTORNEY 3,093,108
Patented June 11, 1963

3,093,108
TIRE PRESSURE SIGNAL DEVICE
Ralph P. Wells, P.O. Box 50–274, Gratigny Station, and Joyce M. Lawrence, 4000 NW. 190th St., both of Opa-Locka, Fla.
Filed Nov. 14, 1961, Ser. No. 152,335
6 Claims. (Cl. 116—34)

This invention relates to inflation safety devices and is directed particularly to improvements in low pressure signal devices for automotive vehicle tires.

Various devices have heretofore been devised for automatically indicating, by audible alarm or otherwise, low tire pressure which might not otherwise become immediately known to the driver. Such prior devices, though highly desirable from the standpoint of driving safety and tire care, have found only very limited acceptance by the driving public for one or more reasons, principal among which are their complexity, size, undependability in performance, and high cost.

It is accordingly the principal object of this invention to provide an improved tire pressure signal device which overcomes the deficiencies such devices heretofore developed.

A more particular object of the invention is to provide a tire pressure signal device of the character described which, when under-inflation by just a few pounds occurs, emits a loud whistle for about a minute or more to warn the driver of low tire pressure, releasing tire air for this purpose, and then shuts off at a lower air pressure high enough to allow driving slowly to a service station, yet low enough to be immediately noticeable by the driver if he didn't happen to hear the whistle alarm.

Still another object of this invention is to provide a tire pressure signal device of the above nature which includes means for automatically protecting against over-inflation.

Yet another object is to provide an improved tire pressure signal device which can be made simply and inexpensively for the most part by injection molding, which will be compact and simple to install, which can readily be adapted for use with tires having various pressure requirements, and which will be long-wearing and dependable in operation.

Other objects, features and advantages of the invention will be apparent from the following description when read with reference to the accompanying drawings.

In the drawings, wherein like reference numbers denote like parts throughout the several views:

FIG. 1 is a partial view of an automobile wheel illustrating a tire pressure signal device embodying the invention shown assembled to the valve stem, FIG. 2 is an enlarged view, in vertical cross section, of the improved tire pressure signal device shown in FIG. 1, FIG. 3 is a horizontal cross-sectional view taken along the line 3—3 of FIG. 2 in the direction of the arrows, FIG. 4 is a horizontal cross-sectional view taken along the line 4—4 of FIG. 2 in the direction of the arrows, FIG. 5 is a top view of the primary ball unseating plunger forming part of the pressure signal device, FIG. 6 is a horizontal cross-sectional view taken along the line 6—6 of FIG. 2 in the direction of the arrows, and FIG. 7 is a horizontal cross-sectional view taken along the line 7—7 of FIG. 2 in the direction of the arrows.

Referring now in detail to the drawings, 10 in FIGS. 1 and 2 denotes an improved tire pressure signal device embodying the invention, the same comprising a housing structure having a base member 11 of hexagonal cross section (see FIG. 4) and internally threaded at its lower end as indicated at 12 to be threadedly received upon the valve stem S of an automobile wheel W (FIG. 1) in place of the usual valve cap. The upper end of base member 11 is internally threaded as indicated at 13 to receive an externally-threaded plug member 14. The flat bottom surface 15 of the threaded portion 13 of the base member 11 is formed with an axial cylindrical recess 16 which communicates with a coaxial, reduced-diameter, cylindrical passageway 17 extending into the internally-threaded portion at the lower end of said base member. As best illustrated in FIG. 4, four grooves 18 spaced at 90 circular degrees are formed between the lower end of the periphery of the cylindrical recess 16 and the lower end of the periphery of the cylindrical passageway 17, for the purpose hereinafter appearing.

Arranged within the cylindrical recess 16 and normally resting upon the arcuate segments 19 at the upper end of the cylindrical passageway 17 of the base member 11 is a spherical ball 20 of slightly lesser diameter than the diameter of said cylindrical recess. The lower end of the plug member 14 is formed with a central hemispherical recess 21, of the same diameter as, but slightly spaced from the upper surface of the ball 20 when resting as above described.

The plug member 14 is formed, from the upper end, with an axial cylindrical recess 22 which communicates at its lower end with a reduced diameter cylindrical recess 23, the lower end of which communicates, in turn, with a cylindrical opening 24 of still lesser diameter which extends into the hemispherical recess 21. As best illustrated in FIG. 3, four wedged shaped grooves 25 spaced at 90 circular degrees are formed between the lower end of the periphery of the cylindrical recess 22 and the interior surface of the cylindrical recess 23. As illustrated in FIG. 7, four rectangular grooves 26 spaced at 90 circular degrees extend from end to end along the cylindrical opening 24.

Disposed within the cylindrical recess 22 is a spherical ball 27 of slightly lesser diameter than that of said recess.

Threadedly received upon the upper end of the externally-threaded plug member 14 is the lower end of a body member 28, which lower end is internally threaded for this purpose as indicated at 29a. The lower end of the body member 28 is formed with a central hemispherical recess 29 of the same diameter as that of ball 27. A helical compression spring 30, arranged within the cylindrical recess 23 and acting between the underside of the ball 27 and the bottom of said recess serves to hold said ball fully seated upwardly within the hemispherical recess 29 when tire air pressure exerted from below through the tire valve stem S is above a certain minimum operating pressure, as hereinbelow more fully described. There is further coaxially arranged within the recess 23 a cylindrical cup member 31 having an axial cylindrical plunger portion 32 slidingly disposed in the cylindrical opening 24 and in abutment with the upper end portion of the ball 20. A relatively weak helical compression spring 33 is constrained between the lower end of the ball 27 and the bottom interior surface of the cup member 31.

The upper end of the body member 28 is formed with an internally-threaded axial recess 34 threadedly received within which is a second externally-threaded plug member 35. The plug member 35 is formed with an axial cylindrical opening 36 which extends into a cylindrical recess 37 of the same diameter in the upper end of the body member 28 within which is slidingly received a disclike piston member 38 having integrally formed therewith an axial plunger portion 39 slidingly received in an axial cylindrical opening 40 communicating between the inner end of the recess 37 and the hemispherical recess 29. The opening 40 is formed with four rectangular grooves 41 spaced at 90 circular degrees and extending from end-to-end along said opening.

Threadedly received upon the upper end of the plug member 35 is a top member 42 having an internally-threaded axial recess 43 at its lower end for this purpose. The upper end of the top member 42 is of reduced diameter and externally-threaded, as at 44, to receive a whistle cap 45, hereinbelow more fully described. The top member 42 is formed with an interior transverse wall 46 having a central opening 47 communicating between the lower end recess 43 and a cylindrical recess 48 formed in the upper end of said top member. A helical compression spring 49 is disposed within the chamber afforded by the cylindrical opening 36 in the plug member 35 and the cylindrical recess 37 in the body member 28, said spring being constrained between the upper end of the piston member 38 and the underside of the transverse wall 46. As illustrated in FIG. 2, the lower end of the plunger portion 39 of the piston member 38 is in abutment with the upper end of the ball 27, and is long enough so that the peripheral bead 50 formed on the underside of said piston member is slightly spaced from the bottom wall of the cylindrical recess 37 in the body member 28, for the purpose hereinbelow appearing. As illustrated in FIG. 5, four openings 51 are provided in the piston member 38 to allow free passage of air, as hereinbelow more fully described.

The whistle cap 45 is formed with an internally-threaded skirt portion 52 integrally formed with a top wall 53 having a central upstanding dome 54. The dome 54 is provided with a blind bore 55 extending from the inside of the whistle cap 45 and providing an oscillatory air chamber. The lower end of the dome 54 is provided with a wedge shaped slit 56 extending from the outside into the air chamber bore 55.

Means is provided for bleeding off air applied in excess of tire pressure when inflating a tire through the tire pressure signal device. To this end the side wall of the body member 28 is transversely drilled and tapped, as indicated at 57, to threadingly receive the externally-threaded end 58 of a relief valve body member 59. The outer end of the relief valve body member 59 is of increased diameter and externally-threaded as at 60 to receive thereon an internally-threaded cap member 61. The outer end of the relief valve body member 59 is also formed with an axially extending conical recess 62 the inner end of which communicates with a central bore 63. The outer end of the bore 63 communicates with a bore 64 of like diameter formed in the body member 28 and communicating at its inner end with one of the rectangular grooves 41 provided in the cylindrical opening 40 of said body member (see FIGS. 2 and 6). A conical valve member 65 is disposed within the conical recess 62 and normally held in seating engagement therein, so as to seal off the central bore 63, by a helical compression spring 66 constrained between the outer end of said valve member and the inside of the end wall 67 of the cap member 61. A central opening 68 is provided in the end wall 67 to permit the escape of excess air, as hereinbelow more fully described.

Considering now the operation of the tire pressure signal device embodying the invention, the same will be securely fitted upon the threaded end of the tire valve stem S, as illustrated in FIGS. 1 and 2, after first having removed the usual valve core from said valve stem. Removal of the whistle cap 45 will enable filling the tire with air under pressure by application of an ordinary air hose fitting to externally-threaded upper end 44 of the top member 42. When the tire to be inflated has no air, or is underinflated, the pressure of the spring 49 being exerted down upon the ball 62 through the piston member 38 is greater than the upwardly directed force against said ball exerted by the lower spring 30, whereby said ball will be moved down upon the peripheral upper edge of the cylindrical recess 23 in the plug member 14. Air under pressure will thus flow into the tire through the central opening 47, the openings 51 in the piston member 38, the rectangular grooves 41, the space between the hemispherical recess 29 and the ball 27, the wedge-shaped grooves 25, the rectangular grooves 26, the space between the hemispherical recess 21 and the ball 20, and the grooves 18. By the time proper inflation pressure is reached, say 28 pounds per square inch, the force of this pressure exerted from below upon the lower hemispherical surface of the ball 27 is more than sufficient by two or three pounds per square inch, added to the force of the lower spring 30, to overcome the downward force of the upper spring 49, and said ball will have moved upwardly into seating engagement with the hemispherical recess 29, thereby sealing off the tire at this predetermined operating pressure. If it is attempted to add additional air at a greater pressure, the relief valve member 65 will become unseated, the spring 66 of said valve member being of such force as allows unseating of said valve member at a pressure value slightly in excess of operating pressure. FIG. 2 illustrates the pressure signal device under operating tire pressure, with the whistle cap 45 in place.

It will be apparent now that if tire pressure falls more than two or three pounds per square inch below the operating pressure of 28 pounds per square inch, for example, the ball 27 will move out of engagement with its hemispherical recess 29 and allow air from the tire to escape through the inflation path detailed above, into the whistle cap 45, whence it will escape through the whistle slit 56, causing a shrill whistle alarm. The downward force exerted by the relatively weak spring 33 upon the ball 20 through the cylindrical cup member 31 is such that when the air pressure in the tire falls to a low value of about 20 pounds per square inch, the back pressure of air exerted upon said ball from above drops off to such a low value that the spring alone can no longer keep the ball unseated with respect to its hemispherical recess 29. At this point the ball 20 will move upwardly into firm seating engagement in the hemispherical recess 29 to prevent further escape of air from the tire. Thus sufficient air will be left in the tire, after having given the low pressure signal whistle, to permit slow driving to the nearest service station for air or tire repair. This under-inflation will be great enough, moreover, to be noticeable even if the driver did not happen to hear the low pressure signal.

One advantage of the tire pressure alarm device is that its various parts, with the exception of the helical springs, can be inexpensively produced of a synthetic plastic material by injection molding.

Another advantage resides in its compactness, and its adaptability to operation at various pressures, depending upon the vehicle and tire to which it is applied, simply by changing the sizes of the various helical springs.

While we have illustrated and described herein only one form in which the invention may conveniently be embodied in practice, this embodiment is given by way of example only, and not in a limiting sense. The invention, in brief, is limited only by the scope and spirit of the following claims.

What we claim as new and desire to secure by Letters Patent is:

1. In a tire pressure signal device for use with pneumatic tires having an inflation valve stem, the combination comprising, an elongated housing structure, means for attaching one end of said housing structure to a tire inflation valve stem, an opening in said housing structure for receiving air under pressure for delivery through said housing structure for inflating a tire, an air flow passageway between said opening and said attaching means, air flow control means in said passageway for preventing the outward flow of air under pressure from said tire when above a certain maximum pressure greater than atmospheric pressure, air flow control means in said passageway for automatically preventing the outflow of air under pressure from said tire when below a certain minimum pressure less than said maximum pressure, and a whistle cap attachable over said air receiving opening and operable to sound an audible whistle while air is flowing outwardly through said passageway.

2. A tire pressure signal device as defined in claim 1 including auxiliary means in said housing structure for bleeding off air under pressure applied to said air pressure receiving opening when in excess by more than a predetermined amount of said maximum pressure.

3. A tire pressure signal device as defined in claim 1 wherein said air flow control means for preventing the outward flow of air when under a certain maximum pressure greater than atmospheric pressure comprises a hemispherical recess in said passageway, a spherical ball of substantially the same diameter as said hemispherical recess and movable between a first position in seating engagement with said recess and a second position away from seating engagement with said recess, a first resilient mtans operative to urge said ball towards said second position, and a second resilient means operative to urge said ball towards said first position.

4. A tire pressure signal device as defined in claim 1 wherein said air flow control means for preventing the outward flow of air when under a certain minimum pressure less than said maximum pressure comprises a hemispherical recess in said passageway, a spherical ball of substantially the same diameter as said hemispherical recess and movable between a first position in seating engagement with said recess and a second position away from seating engagement with said recess, and resilient means operative to urge said second ball towards said second of its positions.

5. A tire pressure signal device as defined in claim 1 wherein said air flow control means for preventing the outward flow of air when under a certain maximum pressure greater than atmospheric pressure comprises a hemispherical recess in said passageway, a spherical ball of substantially the same diameter as said hemispherical recess and movable between a first position in seating engagement with said recess and a second position away from seating engagement with said recess, a first resilient means operative to urge said ball towards said second position, and a second resilient means operative to urge said ball towards said first position, and wherein said air flow control means for preventing the outward flow of air when under a certain minimum pressure less than said maximum pressure comprises a second hemispherical recess in said passageway, a second spherical ball of substantially the same diameter as said second hemispherical recess and movable between a first position in seating engagement with said second recess and a second position away from seating engagement with said second recess, and resilient means operative to urge said second ball towards said second of its positions.

6. A tire pressure signal device as defined in claim 2 wherein said auxiliary bleeding off means comprises a conical valve seat, an air flow conduit communicating between said conical seat and said passageway at a zone along said passageway between sid hemispherical recess and said opening, a conical valve seatable in said conical seat, and resilient means urging said conical valve in seating engagement in said conical valve seat.

References Cited in the file of this patent

UNITED STATES PATENTS

| | | |
|---|---|---|
| 1,016,519 | Predock et al. | Feb. 6, 1912 |
| 1,151,044 | Relyea | Aug. 24, 1915 |